(12) United States Patent
Sackstein et al.

(10) Patent No.: US 8,290,036 B2
(45) Date of Patent: Oct. 16, 2012

(54) METHOD, APPARATUS AND SYSTEM FOR CONCURRENT PROCESSING OF MULTIPLE VIDEO STREAMS

(75) Inventors: David Sackstein, Kfar Saba (IL); Yael Lapid, Tel Aviv (IL)

(73) Assignee: Optibase Technologies Ltd., Herzelia (IL)

( * ) Notice: Subject to any disclaimer, the term of this patent is extended or adjusted under 35 U.S.C. 154(b) by 899 days.

(21) Appl. No.: 12/390,546

(22) Filed: Feb. 23, 2009

(65) Prior Publication Data

US 2009/0310668 A1    Dec. 17, 2009

Related U.S. Application Data

(60) Provisional application No. 61/129,204, filed on Jun. 11, 2008.

(51) Int. Cl.
*H04N 11/02* (2006.01)
(52) U.S. Cl. .................................. 375/240.01
(58) Field of Classification Search .......... 370/229–234; 375/240–241
See application file for complete search history.

(56) References Cited

U.S. PATENT DOCUMENTS

| | | | |
|---|---|---|---|
| 6,434,197 B1* | 8/2002 | Wang et al. | 375/240.29 |
| 6,574,279 B1* | 6/2003 | Vetro et al. | 375/240.23 |
| 6,625,320 B1* | 9/2003 | Nilsson et al. | 382/238 |
| 6,628,712 B1* | 9/2003 | Le Maguet | 375/240.12 |
| 2006/0120466 A1* | 6/2006 | Yoshinari et al. | 375/259 |
| 2009/0092183 A1* | 4/2009 | O'Hern | 375/240.01 |
| 2009/0144792 A1* | 6/2009 | Fielibert et al. | 725/116 |

* cited by examiner

*Primary Examiner* — Ricky Ngo
*Assistant Examiner* — Wei-Po Kao
(74) *Attorney, Agent, or Firm* — Pearl Cohen Zedek Latzer, LLP

(57) ABSTRACT

A system apparatus and method for concurrent delivery of a plurality of video streams comprising one or more transcoders for bitrate reduction and a cache memory to save copies of transcoded segments. When the total outgoing bitrate of the system exceeds a predefined threshold, the system decides which of the video segments to transcode and the magnitude of bitrate reduction. Before assigning a transcoder for the bitrate reduction, the system first checks the cache for saved transcoded segments. If appropriate transcoded segments are not found in cache, the system may assign a transcoder for the video segments designated for bitrate reduction.

33 Claims, 3 Drawing Sheets

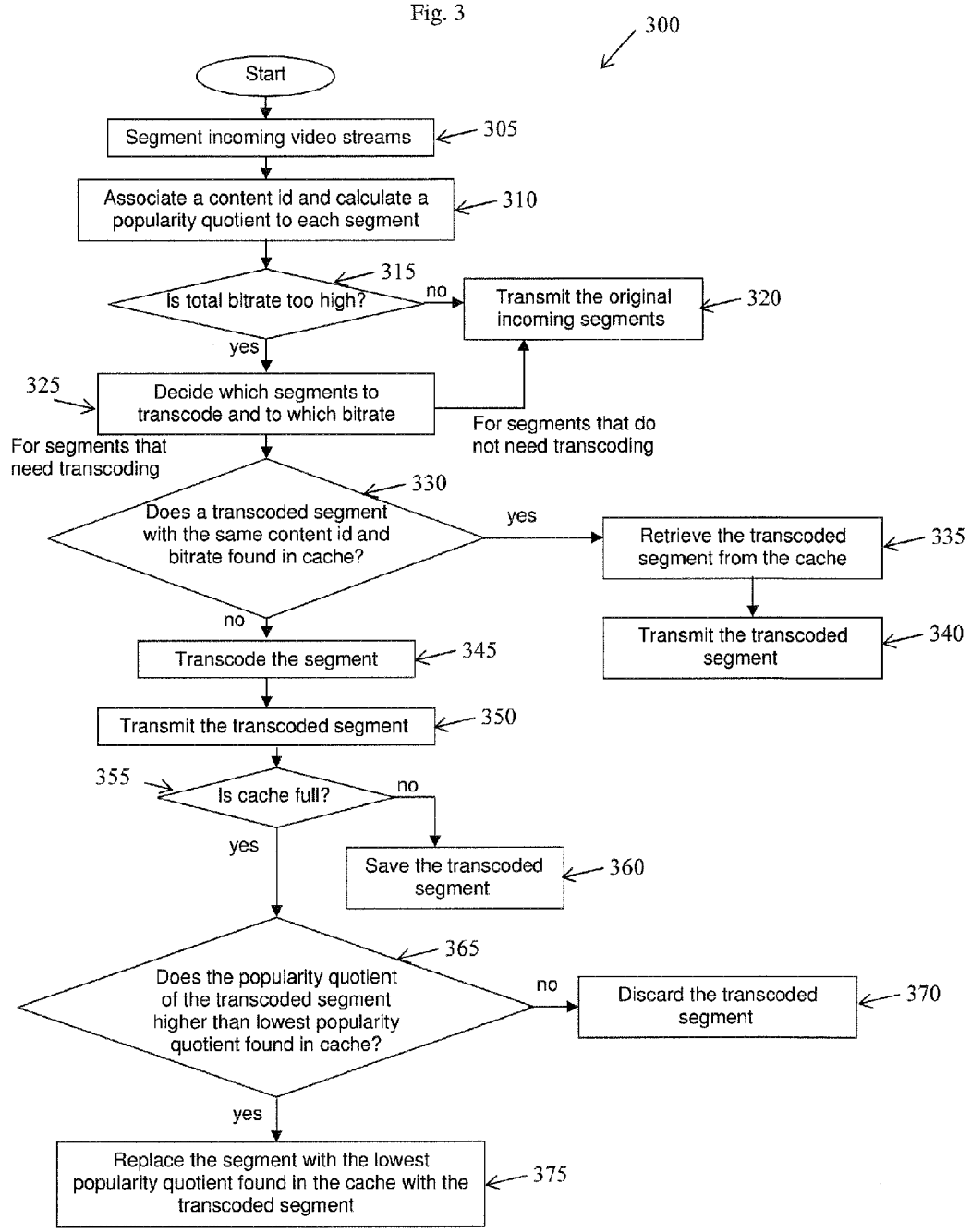

METHOD, APPARATUS AND SYSTEM FOR CONCURRENT PROCESSING OF MULTIPLE VIDEO STREAMS

CROSS REFERENCE TO RELATED APPLICATIONS

This application claims the benefit of U.S. Provisional Application Ser. No. 61/129,204, filed on Jun. 11, 2008 and entitled A Method for Efficient Concurrent Processing of Multiple Video Streams, the entire contents of which are incorporated herein by reference.

FIELD OF THE INVENTION

The present invention relates generally to the field of video on demand services, and more specifically, to bandwidth management for video on demand services.

BACKGROUND OF THE INVENTION

Video on demand (VOD) services involves delivery of a plurality of articles of digital video content from one or more storage devices to a plurality of viewers, usually substantially concurrently, wherein each viewer is generally capable of selecting the digital video article for viewing, the viewing schedule and/or the duration of the viewing. For example, one type of VOD service may be the delivery of movies to home subscribers over a network, e.g., an Asymmetric Digital Subscriber Line (ADSL) network, by a television over Internet Protocol (IPTV) service provider. The digital representation of an article of digital video content is referred to as a "stream" and delivery of a stream over a network while it is being viewed is referred to as "streaming" the content to a viewer's computing device, e.g., a set-top box.

Generally, the rate with which information may be delivered over any network is limited, where the maximum rate of information is referred to as the "capacity" or "maximum bandwidth" of the network. In a VOD network, each item of content is delivered at a delivery rate that may be constant or may vary. The instantaneous rate is referred to as the 'bitrate' of the stream. The total bitrate for the entire VOD network at any moment is equal to the sum of the instantaneous bitrates of all the streams being delivered at that time.

If, at any given time, the total bitrate exceeds the maximum bandwidth of the network, information will be discarded from one or more of the streams, thereby resulting in visible and/or audible artifacts for at least the duration of the excess. It will be understood that the total bitrate of the system may depend on the instantaneous bitrates of the content demanded by viewers and the timing of their selection. Thus, for example, if a large number of users request video content, each request having a high bitrate, the total bitrate of the VOD network will be high. Alternately, for example, if a small number of users request video content, each request having a low bitrate, the total bitrate of the VOD network will be low. Therefore, while the total bitrate of the system is an important parameter in designing and operating a VOD system, variables that determine the total bitrate, e.g., bitrate of video requests and timing of the requests, are generally unpredictable.

In many VOD networks, video streams have substantially the same bitrate, and the bitrate for each stream may remain constant over time. Accordingly, the total bitrate of the system may depend strongly on the timing of viewer requests, which may be a function of subscriber viewing patterns. This observation has led some VOD operators to plan systems around such viewing patterns. For example, viewer demand may tend to reach maximum levels during certain days or the week, e.g., weekends, or during certain times of day, e.g., evening hours, as these are leisure hours, thereby generally requiring higher total bitrate; whereas viewer demand may tend to wane during working hours, thereby generally requiring lower total bitrate. Nevertheless, despite such expected patterns, it may be difficult to estimate with sufficient accuracy the instantaneous total bitrate of a VOD system at any time.

In some VOD systems, in order to avoid the loss of information when the demand for content is high, a strategy known in the art as network over-provisioning may be applied. According to such an approach, the maximum bandwidth of the network may be designed to be higher than the maximum expected total bitrate. However, this usually entails a significant financial investment in the network infrastructure or a compromise on the bitrates of the streams that will be delivered. According to another solution, known as selective denial-of-service, the total bitrate may be monitored and, when it reaches a number sufficiently near the maximum bandwidth of the network, all further requests for content by viewers are denied. If this policy is applied too often in a commercial VOD service, customers will be dissatisfied by the inability to get video "on demand" and may abandon the service. Each of these systems (and their combination) is an unsatisfactory solution.

A processing technique, known as "transrating" or "transcoding", can be applied to a compressed digital video content item during streaming in order to reduce the instantaneous bitrate of the stream that will be delivered over a network. Transcoding may degrade the perceived quality of the video item eventually displayed to the viewer with respect to the item as originally transmitted. Moreover, the degradation in quality may increase as the reduction in rate is increased. However, there are methods known in the art for mitigating the impact of transcoding on perceived quality based on the complexity of the video and known behavior of the human perceptive system.

A related method used in this field is referred to as statistical multiplexing, which may be applied to the delivery of a predetermined set of live TV channels over a satellite network. Using this method, a transcoder may be assigned to each stream for bitrate reduction. The transcoders may also provide information regarding the complexity of the streams to a controller. The controller may then dynamically assign allowable bitrate to each transcoder based on the stream relative complexity such that the total bitrate does not exceed the maximum bandwidth of the network.

Statistical multiplexing may not fit VOD services because, unlike the live TV broadcast scenario, the on-demand scenario may require the delivery of an unpredictable number of streams at one time. Moreover, the number of streams may not be constant and may reach as many as a few thousand, whereas statistical multiplexing is typically used for satellite transponders to multiplex approximately 10-15 channels. Therefore, the cost of allocating a transcoder for each of the maximum number of streams in a VOD system may be prohibitively high.

It is an object of the embodiments of the invention, therefore, to provide a feasibly priced apparatus, system and method for delivery of a variable number of video streams having relatively low video quality degradation and/or low denial-of-service rates.

SUMMARY OF THE INVENTION

According to some embodiments of the invention, there is provided a system for concurrent delivery of a plurality of video streams comprising: a classifier to receive at least one incoming video stream, to segment said incoming video stream into a plurality of video segments; a controller to select video segments for bitrate reduction; at least one transcoder to transcode said selected video segments to a target bitrate; a cache memory to store transcoded video segments; and a transmitter to transmit at least said transcoded video segments, wherein said controller is to monitor the total bitrate of outgoing video streams by said transmitter, and to compare said total bitrate to a threshold, and wherein said selection of video segments for transcoding and a determination of target bitrate for transcoding of said selected video segments are based at least on said comparison.

According to some embodiments of the invention, there is provided a method for concurrent delivery of a plurality of video streams comprising: receiving at least one incoming video stream; segmenting said incoming video stream into a plurality of video segments; selecting video segments for bitrate reduction; transcoding said selected video segments to a target bitrate; storing transcoded video segments in a cache memory; transmitting at least said transcoded video segments; monitoring the total bitrate of outgoing video streams; and comparing said total bitrate to a threshold, wherein said selection of video segments for transcoding and a determination of target bitrate for transcoding of said selected video segments are based at least on said comparison.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 shows an exemplary flowchart according to some embodiments of the invention.

Figure 1:
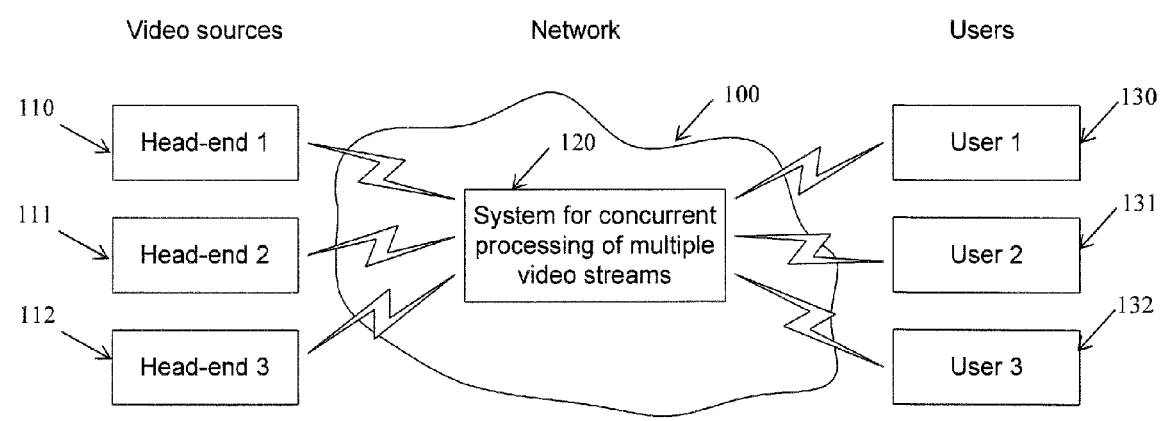
FIG. 1 shows an exemplary streaming video network.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

It should be appreciated that according to some embodiments of the present invention, the method described below may be implemented in machine-executable instructions. These instructions may be used to cause a general-purpose or special-purpose processor that is programmed with the instructions to perform the operations described. Alternatively, the operations may be performed by specific hardware that may contain hardwired logic for performing the operations, or by any combination of programmed computer components and custom hardware components.

Reference is made to FIG. 1, which schematically illustrates an exemplary streaming video network 100 in which a system 120 of concurrent processing of multiple video streams may operate. FIG. 1 shows a plurality of video sources, or headends, 110, 111, 112, which may be connected through network 100 to system 120, which may stream the video to a plurality of users 130, 131, 132.

Streaming video network 100 may be implemented, for example, as Cable TV or IPTV network. Generally, streaming video network 100 may be divided into two parts, the backbone which interconnects headends 110, 111 and 112, and the last mile which consists of the connections of users 130, 131, 132 to the backbone.

The backbone may be a fast IP or ATM network typically implemented over fiber-optic infrastructure. The last mile may be an IP network implemented using coax technology or ADSL. This part of the network may be much slower than the backbone as each segment of the network is only designed to serve one household or business. The last mile may also be implemented wholly or partially using fiber-optic infrastructure increasing the bitrates that the network can deliver to each subscriber.

Headends 110, 111 and 112 may contain video servers that may store video assets and deliver them, on demand, over the last mile to a subscriber. Different video servers may store copies of the same information.

Users 130, 131, 132, typically homes or businesses, may demand to view content on their customer premise equipment which may typically be a PC or TV monitor equipped with a set-top box. If the content can be found on the video server in the headend that serves the area in which the customer is located, that video may be streamed over the last mile from the headend to the user. If that content is not on the local video server but can be located on another video server in the near vicinity, then the video may be streamed from that video server, across the backbone and then over the last mile.

Congestion of the backbone network may occur if many subscribers make demands to view new content. System 120 may be placed within the backbone network to intercept traffic that is being sent from video servers to users. System 120 may emit lower total bitrate comparing to the total bitrate that system 120 receives while causing relatively little damage to the video quality and while using a scalable amount of processing resources.

Figure 2:
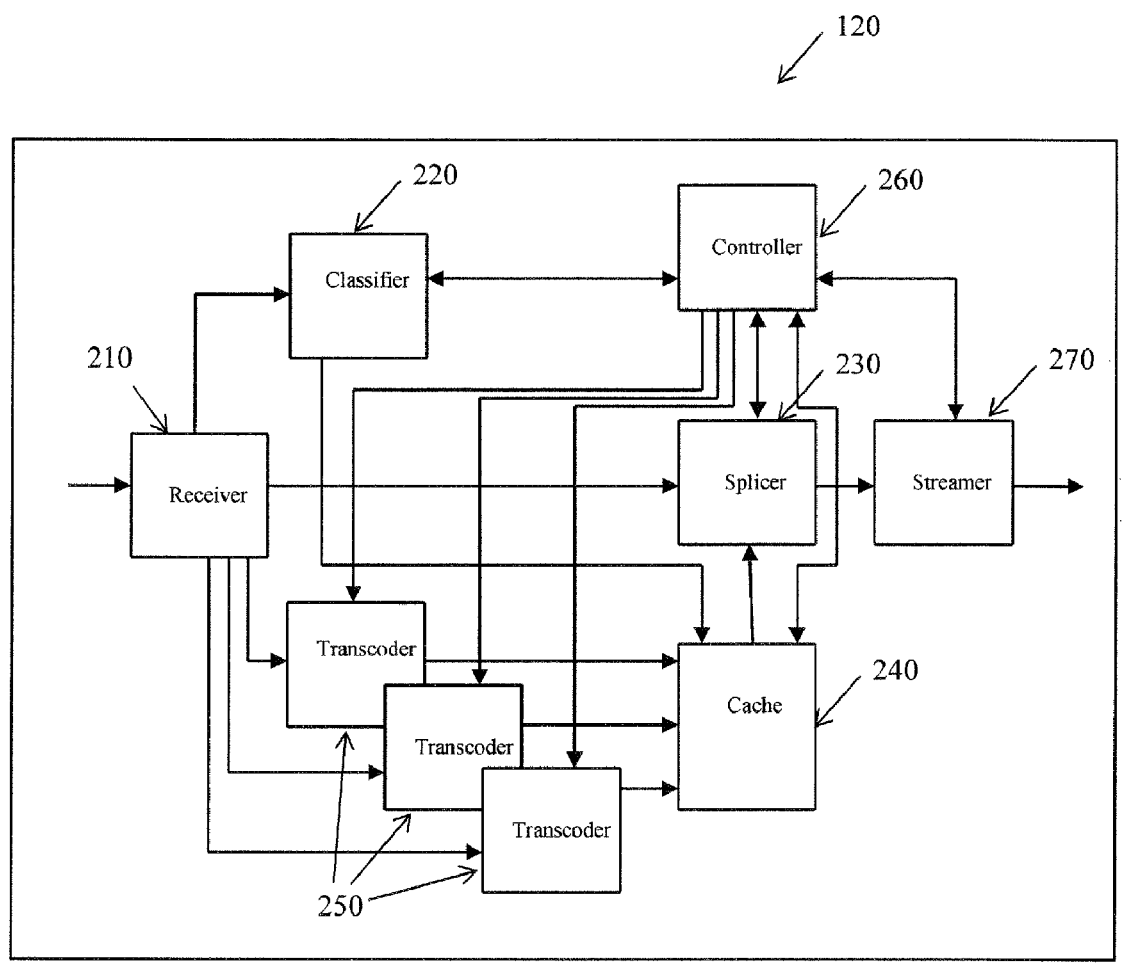
FIG. 2 shows a block diagram according to some embodiments of the invention.

Reference is made to FIG. 2, which schematically illustrates a system 120 of concurrent processing of multiple video streams according to some demonstrative embodiments of the invention. Although embodiments of the invention are not limited in this respect, system 120 may include a receiver 210 that receives a plurality of video streams and delivers the streams to the classifier 220 and the splicer 230 or transcoders 250.

Controller 260 may instruct receiver 210 to send the video to transcoders 250 or directly to splicer 230. Receiver 210 should be able to handle many streams concurrently and to deliver them at substantially accurate timing schedules. Receiver 210 may be implemented in software, or in dedicated hardware, such as, for example, FPGA or ASIC.

Although embodiments of the invention are not limited in this respect, system 120 may include a classifier 220 that segments the video streams using a classifying algorithm. The classifying algorithm may use any repeatable method of dividing a video stream into segments, such that an identical video input would produce identical output segments.

According to some embodiments of the invention, segment boundaries may be points in time that video bitrates may be changed, or any other suitable boundary, for example, a scene change, etc.

Segmentation may be done based on the syntax of the bitstream, for example, making each GOP a segment. This may require relatively low processing. Alternatively, segmentation methods may be based on the content itself, for example, each scene may be a segment. Content based segmentation requires analysis of the content and, therefore may be computationally intensive. Aligning segmentation with scene changes allows the system to select optimal bitrates throughout the streaming. For example, talking head scenes may typically require lower bitrates comparing to car chase or sports scenes.

When applying syntax based segmentation, the duration of a segment may typically be around half a second or some integral multiple thereof, as this is the duration of a GOP in many MPEG streams. For content based segmentation, segments may typically not have the same duration. The optimal segment duration is a trade-off between the following considerations. If the segment is long, it may take the system a long time to adapt a stream to a new bitrate. If the segment is short, the change in video bitrate that can be implemented at segment boundaries may be kept small to prevent the introduction of video artifacts during playback.

The classifier may further associate a content identifier (content id) to the segments of the video streams. In some embodiments of the invention, content id may be produced as a result of a hash operation on the bits of the segment using an algorithm such as MD5 or SHA-1. In some embodiments of the invention, content id may be produced as a result of the hash operation on the bits of the segment concatenated with the bitrate value. Alternatively, other hash algorithms or techniques having a low order of complexity may be used, such that the calculation is suitably rapid.

Hash algorithms may not guarantee that different inputs will not result in identical hash values; however they typically make the probability of this occurring very low. The margin of error of such a nearly unique content id algorithm may be adjusted to produce an arbitrarily low level of errors. It will be recognized that in some embodiments of the invention, the less error is tolerated, the more time may be required for content id calculation.

In some embodiments of the system, the classifier may further calculate a counter or popularity quotient for each segment of each stream. In some embodiments, a popularity quotient may be provided in advance by the content provider, based on known historical or anticipated popularity of a content item. In some embodiments, a popularity quotient may be calculated based on a running total of the number of requests for a particular video content item. Some embodiments may use both methods, and/or other popularity quotient calculation methods. In some embodiments including a plurality of systems 120 for distributing common content, the systems may update popularity quotients by sharing such popularity information pertaining to content items.

Although embodiments of the invention are not limited in this respect, system 120 may include a cache memory 240 for saving transcoded video segments, together with their popularity quotient, and indexed by their content id which may optionally have been generated using the bitrate at which the content item has been transcoded as well as from the segment data itself. Thus, in some embodiments of the invention, some segments may be cached multiple times with different transcoding bitrates.

Although embodiments of the invention are not limited in this respect, system 120 may include one or more transcoders 250 to transcode input video segments to video segments having lower bitrates as known in the art. One or more of transcoders 250 may be implemented in dedicated hardware. For instance, a transcoder may be implemented on a DSP, such as the Texas Instruments TMS320DM6467 DaVinci processor or on a proprietary ASIC or FPGA such as the encode and decode products of Ateme. A transcoder might also be implemented on a mixture of dedicated hardware and dedicated software. The system is not limited to any one form of transcoding. Examples of transcoding methods are the translation of the content to a lower resolution and the modification of quantization coefficients, such that the same information may be transmitted using less bitrate or bandwidth.

Although embodiments of the invention are not limited in this respect, system 120 may include a controller 260 that monitors the total bitrate of outgoing streams. If the total bitrate is too high, the controller 260 may decide which of the streams will be transcoded and the magnitude of the bitrate reduction, which information may be used to control transcoders 250. Further, upon notification of an incoming video content item, the controller 260 may check the cache 240 for a transcoded segments with the same content id and bitrate as requested. If a suitable segment is found in cache 240, for example, based on content id, or based on content id and transcoded bitrate, the controller 260 may retrieve the suitable segment and send it to the splicer 230. If not, controller 260 may assign one of transcoders 250 to transcode the segment to the required bitrate, which will transcode the incoming segment and store the transcoded segment in cache 240.

Although embodiments of the invention are not limited in this respect, system 120 may further include a splicer 230 that forwards video streams to the streamer 270. Upon request from the controller 260, the splicer 230 may replace segments of an incoming video stream with the transcoded copy retrieved from cache 240 via the controller 260, or directly from the transcoder 250. If no transcoding is required, splicer 230 may forward the original incoming video stream.

Although embodiments of the invention are not limited in this respect, system 120 may further include a streamer 270 which may receive video streams from splicer 230 and transmits them to their designated reception device. The function of the streamer 270 may be to packetize the content received from splicer 230 and to send each packet to its destination at the appropriate time. Streamer 270 may buffer packets in order to emit the packets at substantially equal intervals providing a substantially constant bitrate equivalent to the average bitrate produced by splicer 230. Alternatively, streamer 270 may vary the bitrate at segment boundaries according to the bitrate at which each segment was transcoded. This will create a piecewise constant bitrate for each stream. Other scheduling strategies may be implemented.

It will be appreciated that in some embodiments of the system one or more popularity quotients may be associated to incoming video segments. The popularity quotient may relate to the popularity and timing of requests for a video segment. For example, a popularity quotient of a segment may indicate that there have been many requests for the segment, that the requests were recent, or both.

For example, a popularity quotient may be calculated by keeping a counter and time value records for incoming segments. If the records already exist for an incoming segment, then the time value may be incremented by the current time and the counter value may be incremented by one. The time value divided by the counter value may be referred to as the "average time of arrivals" of the associated segment. The current time less the average time of arrivals may be referred to as "the average age" of the segment. In some embodiments of the invention, the popularity quotient may be calculated by dividing the counter by the average age. Calculated in this manner, a high popularity quotient may indicate that there have been many requests for the segment, that the requests were recent, or both. A low popularity quotient may indicate that there have been few requests for the segment, that the requests were not recent, or both. Other suitable algorithms for calculating popularity quotient may be used.

In some demonstrative embodiments of the invention, the popularity quotient may be calculated taking into account data received from resources found outside system 120, such as, for example, similar systems found in the network, the head-end, or other suitable network components. In some embodiments of the invention, classifier 220, cache 240, or both, may calculate popularity quotients.

In accordance with some demonstrative embodiments of the invention, a cache management algorithm may be implemented. The algorithm may dictate when segments are inserted and when they are removed from the cache. For example, if cache 240 is full, the cache management algorithm may discard a less frequently used segment and insert a newly transcoded segment.

A simple example for a cache management algorithm may include keeping a record of a predetermined threshold for the total number of bytes that can be stored in the cache 240. If the size of the segment is such that when added to the cache 240, the total number of bytes will not exceed the predetermined threshold, the segment may be inserted in the cache 240. If the size of the segment is such that when added to the cache 240, the total number of bytes will exceed the predetermined threshold, then if the popularity quotient of the incoming segment is lower or equal to the lowest popularity quotient of segments in the cache, it will not be inserted in the cache 240. Otherwise, the segment in the cache 240 with the lowest popularity quotient may be removed from the cache 240 and replaced by the incoming segment. Using this method, the cache 240 may contain the most popular video segments. Other suitable cache management algorithms may be implemented.

According to some demonstrative embodiments of the invention, cache 240 may be implemented as a distributed cache. That is, each system 120 may contain storage for segments and may share segments with other systems if necessary. In some embodiments of the invention, use of a distributed cache may involve the following enhancement: in addition to checking the local cache 240, the controller 260 may also issue requests for the segment to the caches of other or neighboring systems. This process may be called cache snooping. Typically, the access time to a segment found in a remote cache may be longer than the access time to a segment found in the local cache. Therefore, the request may first be issued to the remote cache, and only then to the local cache, such that an affirmative response from a remote cache, e.g., the found segment, would arrive in time so as not to delay transmission. Also, for the same reason, a cache snoop may be accompanied by two time values: one may indicate the time the snoop was issued, the other may indicate the latest time at which the segment must arrive in order to be used by the issuing system. Based on the time of arrival of the snoop request, and the two time values associated with the snoop request, the remote cache may determine that the timing constraints for the request will not be met, and therefore, even if the segment is present in the remote cache, a negative response may be issued. It will be recognized that system 120 may update popularity quotients based on requests for content items from remote systems.

It will be appreciated that in some embodiments of the system the controller 260 may determine which incoming segments should be transcoded and the magnitude of bitrate reduction. In some embodiments of the invention, controller 260 may determine a range of allowed target bitrate, instead of a single value. Such deciding mechanism may be the result of a rate control algorithm that may consider the magnitude of deviation from the desired total bitrate, the popularity quotient of the video segments, the quality of the incoming video segments, or any other relevant parameter. For example, the controller 260 may monitor the total bitrate being emitted by the splicer 230. If the total bitrate of the segments being streamed exceeds a predetermined threshold, the controller 260 may calculate the number of streams to be transcoded and identify the streams to be transcoded. This may be done, for example, by the destination address of the segments that are being streamed with the lowest popularity quotient. The controller 260 may further calculate the required bitrate reduction. For example, the required bitrate reduction may be the excess in total bitrate beyond the predetermined threshold divided by the number of streams to be transcoded. The controller 260 may apply the calculated bitrate reduction to the consequent segments of each of the streams designated for transcoding. In other embodiments of the invention, other suitable deciding mechanism may be implemented.

It will be recognized that juxtaposition of segments having different transcoding schemes may produce visible and undesirable border artifacts. These border artifacts may occur, for example, when the bitrate is reduced or increased, or when a stream goes from being transcoded to having no transcoding, or vice versa. According to some demonstrative embodiments of the invention, the controller or transducer may reduce or increase the bitrate of a video stream gradually towards the latter border of the segment in order to minimize such border artifacts. For example, if a reduction in total bitrate is desired, rather than an abrupt bitrate reduction in a stream, the controller may slightly reduce the bitrate of each of a number of consecutive segments of a video stream, relative to its predecessor, thereby reaching the desired bitrate reduction such that artifacts are reduced, minimized or even eliminated altogether. Additionally or alternatively, the controller or transcoder may transcode a segment using a varying bitrate in order to smooth a transition to a subsequent segment. For example, a portion of a first segment has a first bitrate, which bitrate may then increase or decrease at or near the boundary towards a second bitrate of a second, subsequent segment. The controller may control the average bitrate even though the boundary bitrates may be limited or predetermined.

It will be recognized that ensuring equal bitrates at the two sides of a segment boundary may increase the number of cache misses and thus, may increase the number of transcoding tasks. For example, assume a segment is transcoded to bitrate 2.0 Mbps after a segment that was encoded at 1.5 Mbps. The newly transcoded segment is then placed in the cache 240. When the same video is requested again, the network happens to be free and both segments can be encoded at 2.0 mbps. The first segment needs to be transcoded again, because the cached copy was transcoded to 1.5 Mbps. However, the second segment also needs to be transcoded again because, though the target bitrate of the cached copy is the same as that required for the current session, the bitrate at the start of the cached segment is 1.5 Mbps whereas for the current session, the required starting bitrate is 2.0 Mbps.

According to some embodiments of the present invention two solutions for the above described problem may be implemented. First, a final transcoding step can be added after the splicer 230 to smooth boundaries. Referring to the example, this allows the splicer to reuse the cached copy of the second segment because it averages 2.0 Mbps which is the bitrate required. The starting bitrate will be smoothed by the added transcoder to be 2.0 Mbps instead of 1.5 Mbps. Though this introduces an additional processing step for each stream, transcoding at boundaries only is much less intensive than transcoding every segment in its entirety. Alternatively, a constraint may be added to every transcoding session so that the start and end bitrates of each segment of a stream may be the same. The value of that bitrate may be determined for each video clip based on its average bitrate. This constraint may degrade the quality of the transcoding step, but ensures complete interoperability between segments. Each segment can follow any other segment and no further processing of the output stream is required.

It will be recognized that juxtaposition of segments having different transcoding schemes may produce video or audio decoder buffer overflows and/or underflows around segment boundaries at the receiving side. For example, an underflow condition may occur soon after the decoder completes the decoding of a segment if the occupancy of the decoder buffer after completing the decoding of said segment is low and the bitrate of said segment is lower than the bitrate of the following segment. In this case, the larger encoded pictures of the following segment will not have entered the decoder buffer in time for their scheduled removal by the decoder. Alternatively, for example, an overflow condition may occur soon after the decoder completes the decoding of a segment if the occupancy of the decoder buffer after completing the decoding of said segment is high and the bitrate of said segment is higher than the bitrate of the following segment. In this case, removal of the smaller encoded pictures of the following segment by the decoder may not reduce the occupancy of the decoder buffer sufficiently to avoid overflow.

According to some embodiments of the present invention the following solution for the above described problem may be implemented. Each of the transcoders 250 may transcode each segment such that if the decoder's buffer state is half full before decoding the segment, then the decoder's buffer state after having completed the decoding of the segment may also be half full. This constraint may be met by suitable choices of the transcoded frame sizes by transcoder 250 without violating the target bitrate set by controller 260 for the segment. This may ensure that decoder buffers do not overflow or underflow around the boundary between segments.

According to some embodiments of the invention, transcoder 250 may use any transcoding method that allows the bitrate to vary while eliminating, minimizing or otherwise reducing visible artifacts. Although embodiments of the invention are not limited in this respect, the bitrate reduction may be achieved by changing the quantization scheme of the encoded bitstream. Additionally or alternatively, bitrate reduction may be achieved by modifying the encoded pixel resolution. For example, a digital uncompressed high definition (HD) video signal in the 1080i format contains 2073600 pixels per frame. A digitized NTSC standard definition (SD) signal has 345600 pixels per frame, that is, one sixth of the pixels in the HD signal. Accordingly, an H.264 encoder can typically encode an HD signal at 8.0 Mbps with adequate quality for broadcast, whereas for SD only 1.3 Mbps may be required, a sixth of the bitrate for HD. The difference in quality between the decoded HD signal and the decoded SD may manifest itself in an increase in sharpness and clarity of detail. As known in the art, changing pixel resolution by a factor of six at small intervals may result in an unacceptable visible breathing effect after decoding. However, it is possible to reduce the number of pixels by less than a factor of six and to achieve a degradation that may be significantly less marked. According to some embodiments of the invention, the transcoding operation may be capable of reductions of bitrate by factors equal or lower than 2. Reducing horizontal resolution by a factor of 2, for example, may result in a degradation that is unnoticeable or relatively minor. Other suitable transcoding schemes may be used as well.

Reference is made to FIG. 3, which is a schematic flowchart illustration of a method 300 which may be performed by a system to reduce total bitrate at VOD systems according to some demonstrative embodiments of the invention. Although embodiments of the invention are not limited in this respect, the method may be performed by embodiments of the invention, for example, an embodiment as shown in FIG. 1.

The incoming video streams may be segmented, as indicated at block 305. A content id may be associated to the video segments as indicated in block 310. In some embodiments of the method, a popularity quotient may be associated to the video segments.

At block 315, the total outgoing bitrate may be monitored. If the total bitrate is below a predetermined threshold, the original incoming video streams may be transmitted, as indicated in block 320. However, in case the total bitrate is above the predetermined threshold, the total bitrate may have to be reduced. Initially, as indicated in block 325, a decision as to which segments to transcode and the magnitude of the bitrate reduction may be made. The video segments that are not designated for bitrate reduction may be transmitted substantially unchanged.

After identifying a list of video segments designated for bitrate reduction, each with its target bitrate, a cache may be checked for transcoded segments with the same content id and similar or lower bitrates, as indicated in block 330. If such segments are found, they may be retrieved from the cache and transmitted, as indicated in blocks 335 and 340, respectively. In some embodiments of the invention, only segments with the same content id and the identical bitrate may be retrieved and transmitted. If suitable segments are not found in the cache, the segments may be transcoded into their designated bitrate and the transcoded segments transmitted, as indicated in blocks 345 and 350 respectively.

Prior to saving newly transcoded segments, the amount of available memory in the cache may be evaluated, as indicated in block 355. If the size of a transcoded segment is less than the available memory in the cache, the segment may be saved in the cache, as indicated in block 360, and suitably indexed. Otherwise, a decision as to whether to save or discard a segment may be performed, for example, based on the popularity quotient of the segment and the segments found in cache. Accordingly, for example, if the popularity quotient of the incoming segment is higher than the lowest popularity quotient of one or more segments in the cache that would be required to be erased to save the incoming segment, the one or more segments in the cache with the lowest popularity quotient may be replaced by the incoming segment, as indicated in block 375. Otherwise, the transcoded segment may be discarded, as indicated in block 370.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system for concurrent delivery of a plurality of video streams comprising:
    a classifier to receive at least one incoming video stream, to segment said incoming video stream into a plurality of video segments and to associate each of said video segments with a respective content identifier;
    a controller to select video segments for bitrate reduction;
    at least one transcoder to transcode said selected video segments to a target bitrate;
    a cache memory to store transcoded video segments; and
    a transmitter to transmit at least said transcoded video segments,
    wherein if a transcoded video segment is found in said cache memory, said controller is to send said cached transcoded video segment to the transmitter for transmission, and wherein if said transcoded video segment is not found in said cache memory, said controller is to send said video segment to said transcoder for bitrate reduction, and wherein said controller is further is to:
        monitor the total bitrate of outgoing video streams by said transmitter, and to compare said total bitrate to a threshold, and
        if said transcoded video segment is found in said cache memory, send said cached transcoded video segment to said transmitter for transmission, and if said transcoded video segment is not found in said cache memory, send said video segment to said transcoder for bitrate reduction and wherein storage of said transcoded video segments in said cache memory is indexed by said content identifier and transcoding bitrate;
    wherein said selection of video segments for transcoding and a determination of target bitrate for transcoding of said selected video segments are based at least on said comparison, and wherein upon selection of a video segment for transcoding said controller is further to search said cache memory for transcoded segments having a content identifier matching the content identifier of said selected video segment.

2. The system of claim 1, wherein said controller is further to search said cache memory for transcoded segments having transcoded bitrate not greater than the target bitrate.

3. The system of claim 1, wherein said controller is further to search said cache memory for transcoded segments having transcoded bitrate equal to the target bitrate.

4. The system of claim 1, wherein for at least a portion of said video segments not selected for transcoding, said controller is further to send said unselected video segments to said transmitter for transmission.

5. The system of claim 1, wherein said transmitter includes a splicer to combine video segments and transcoded video segments to produce an outgoing video stream for transmission.

6. The system of claim 5, wherein said transmitter comprises
    a transcoder to receive said outgoing video stream from said splicer and to smooth boundaries between said video segments and said transcoded video segments; and
    a streamer to receive said outgoing video stream from said transcoder and to transmit said outgoing stream.

7. The system of claim 5, wherein said transmitter comprises a streamer to receive said outgoing video stream from said splicer and to transmit said outgoing stream.

8. The system of claim 7 wherein said streamer to packetize said outgoing video stream.

9. The system of claim 7 wherein said streamer to buffer said outgoing video stream packets and to transmit said packets at equal intervals.

10. The system of claim 1, further comprising a receiver to receive a plurality of incoming video streams and to deliver said video streams to said classifier.

11. The system of claim 1, wherein said classifier is further to associate each video segment with a popularity quotient, said popularity quotient indicative of a frequency of requests for said video segment.

12. The system of claim 11, wherein said cache memory is further to store said popularity quotient for each transcoded video segment stored in said cache memory.

13. The system of claim 12, wherein said cache is to determine whether or not to store a transcoded video segment based at least on the popularity quotient associated with said transcoded video segment.

14. The system of claim 1, wherein said transcoder to modify pixel resolution of said selected video segments.

15. The system of claim 1, wherein said transcoder to modify quantization coefficient of said selected video segments.

16. The system of claim 1, wherein said transcoder to ensure equal bitrates at said selected video segments boundaries.

17. The system of claim 1, wherein said transcoder to ensure the decoder buffer at the receiving side remains half full.

18. The system of claim 1, wherein said cache memory is implemented as distributed cache.

19. A method for concurrent delivery of a plurality of video streams comprising:
    receiving at least one incoming video stream;
    segmenting said incoming video stream into a plurality of video segments;
    selecting video segments for bitrate reduction;
    transcoding said selected video segments to a target bitrate;
    associating each of said video segments with a respective content identifier;
    storing transcoded video segments in a cache memory wherein storage of said transcoded video segments in said cache memory is indexed by said content identifier and transcoding bitrate;
    searching said cache memory for transcoded segments having a content identifier matching the content identifier of a selected video segment upon selection of the video segment for transcoding;
    transmitting said cached transcoded video segments if said searched transcoded video segments are found in said cache memory;
    sending said video segments for bitrate reduction if said searched transcoded video segments are not found in said cache memory and transmitting at least said transcoded video segments;

monitoring the total bitrate of outgoing video streams; and comparing said total bitrate to a threshold, wherein said selection of video segments for transcoding and a determination of target bitrate for transcoding of said selected video segments are based at least on said comparison.

20. The method of claim 19, comprising searching said cache memory for transcoded segments having transcoded bitrate not greater than the target bitrate.

21. The method of claim 19, comprising searching said cache memory for transcoded segments having transcoded bitrate equal to the target bitrate.

22. The method of claim 19, transmitting at least a portion of said video segments not selected for transcoding.

23. The method of claim 19, comprising combining video segments and transcoded video segments to produce an outgoing video stream for transmission.

24. The method of claim 23 comprising packetizing said outgoing video stream.

25. The method of claim 23 comprising buffering said outgoing video stream packets and transmitting said packets at equal intervals.

26. The method of claim 23, comprising smoothing boundaries between said video segments and said transcoded video segments.

27. The method of claim 19, comprising associating each video segment with a popularity quotient, said popularity quotient indicative of a frequency of requests for said video segment.

28. The method of claim 27, comprising storing said popularity quotient for each transcoded video segment stored in said cache memory.

29. The method of claim 28, comprising determining whether or not to store a transcoded video segment based at least on the popularity quotient associated with said transcoded video segment.

30. The method of claim 19, wherein said transcoding to modify pixel resolution of said selected video segments.

31. The method of claim 19, wherein said transcoding to modify quantization coefficient of said selected video segments.

32. The method of claim 19, wherein said transcoding to ensure equal bitrates at said selected video segments boundaries.

33. The method of claim 19, wherein said transcoding to ensure the decoder buffer at the receiving side remains half full.

* * * * *